Patented July 27, 1926.

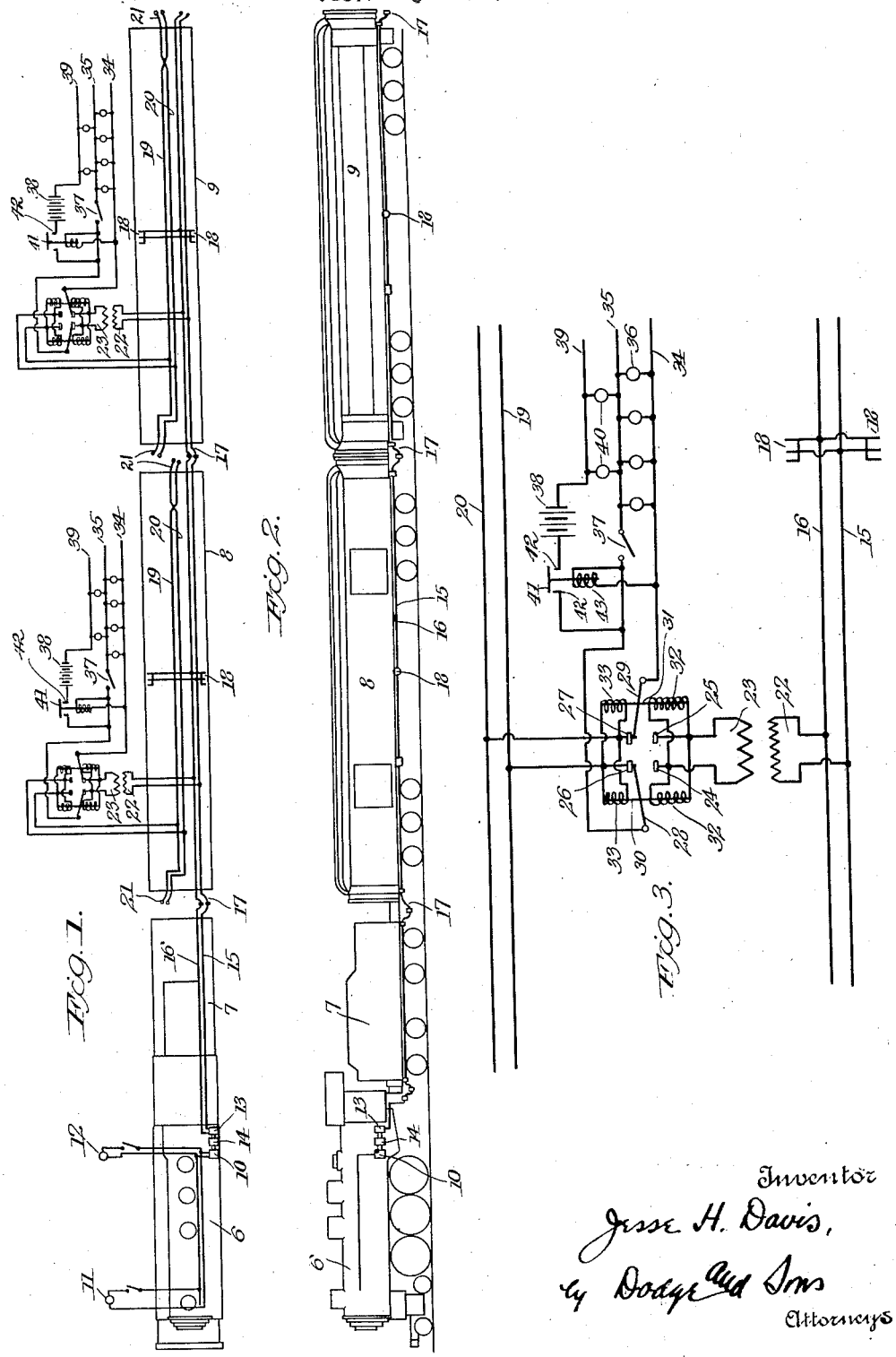

1,593,966

UNITED STATES PATENT OFFICE.

JESSE H. DAVIS, OF BALTIMORE, MARYLAND.

TRAIN-LIGHTING SYSTEM.

Application filed August 13, 1925. Serial No. 50,006.

This invention relates to electrical train lighting systems and provides a simple system having a number of important advantages.

Under normal conditions the train is lighted from a generator on the locomotive. This eliminates the need for storage batteries on the individual cars, such as are customarily provided where axle driven generators are used. When the train is standing in a station or yard and is disconnected from the locomotive, the cars may be lighted by current derived from an ordinary city lighting circuit. When a car equipped according to my system is connected with a car equipped with storage batteries or with storage batteries and an axle driven generator, the first named car may derive its lighting current from the batteries of the other car.

Generally stated, I provide throughout the train a primary feeder circuit which distributes throughout the train alternating current at a voltage available at stations and yards along the line. Under ordinary conditions this would be 110 volts. The primary feeder circuit is connected from car to car in a known manner and each car is provided with a receptacle capable of being connected with current sources in the stations and yards. When a train of cars is connected together it may be fed with alternating current at 110 volts from a generator on the locomotive or by a feeding connection in a station or yard connected to the receptacle on any of the cars in the train. Single cars may be similarly fed.

The lighting circuit on the car is operated at a lower voltage, preferably 30 volts, because this is the lighting voltage now standard for railway train lighting. Under normal conditions the lighting circuit on each car receives its current from the secondary of a transformer on that car whose primary is excited by the primary feeder circuit, either from the generator on the locomotive or from the city circuit, as the case may be.

In order to permit this lighting circuit to be fed on occasion by 30 volts direct current derived from the batteries of an adjacent car having batteries or generator and batteries, I provide on each car a low voltage feeder circuit extending the length of the car and provided with connectors at each end so that the car may under special circumstances be electrically connected to such battery equipped car. A double-pole, double-throw relay is provided and so arranged that when the primary feeder circuit is excited, the car lighting circuit will be connected with the secondary of the transformer. On the other hand, if the low voltage direct current circuit on the car be excited, then the relay will shift and connect the lighting circuit of the car to such low voltage circuit. The two circuits are never excited simultaneously.

These arrangements provide for lighting the car either from the locomotive or from a city alternating current circuit or from an adjacent car or cars having low voltage battery systems. To provide for the rare cases when none of these sources is available, I propose to provide each car with an emergency lighting circuit which is lighted by a battery. This circuit may be of any desired voltage and the battery may be charged in any desired manner. The emergency circuit is so connected that it is controlled, first by the switch which controls the main lighting circuit, and second by a relay subject to the condition of the main lighting circuit and so arranged that whenever the main lighting circuit is energized the emergency circuit will be interrupted.

The system makes use of standard apparatus for the most part and hence is illustrated largely in diagram in the accompanying drawings, in which—

Fig. 1 shows the various circuits in diagram drawn over a plan view of a locomotive, tender and connected train consisting of two cars;

Fig. 2 is an elevation of the same train indicating the location of the various pieces of apparatus relatively to the cars and locomotive and showing the inter-car connectors;

Fig. 3 is a diagram on an enlarged scale showing the circuits for one car.

In the drawings the locomotive is shown at 6, the tender at 7, a baggage car at 8 and a passenger car at 9. On the locomotive there is located a 30 volt D. C. generator 10. This furnishes all the current used on the locomotive, such as that for lighting the headlight 11, cab lights 12 and for any other light or electrical apparatus, such as air brakes, cab signal equipment, and the like which is, or may be, used on locomotives. This detail conforms to present standard practice.

In addition to the generator 10 I provide a 110 volt A. C. generator 13. Preferably I drive both the generators 10 and 13 by a steam turbine 14 which receives its motive steam from the locomotive boiler. From the generator 13 the primary feeder circuit extends rearward under the tender and cars, and the wires composing this circuit are indicated at 15 and 16. They extend throughout the train and connections between cars are made by separable connectors 17.

The primary feeder circuit conductors 15 and 16 are provided on each car with means for connecting them with city lighting circuits. These means comprise ordinary connecting receptacles 18, two being provided and located at opposite sides of the car as a matter of convenience.

In addition to the primary feeder circuit just described, each car is equipped with two wires 19 and 20 which form the low voltage direct current feeder circuit for bringing direct current to cars equipped with my system from adjacent battery lighted cars in case of need. These conductors 19 and 20 are equipped at each end of the car with connectors 21 which are so designed that they may not be connected by mistake with the connectors 17 already described.

The train circuits having now been described, the equipment on a single car will be described with the understanding that this equipment is duplicated on each car.

The primary feeder circuit conductors 15 and 16 are connected to the primary winding 22 of a transformer whose secondary winding is indicated at 23. The terminals of the secondary winding 23 are connected to two contacts 24 and 25 of what may be called a double-pole, double-throw relay. This includes opposed contacts 26 and 27 which are electrically connected respectively with the low voltage direct current conductors 19 and 20. There are two contactors 28 and 29 which are pivoted so that they swing between the opposed pairs of contacts and they are electrically actuated so that they swing in unison. The contactor 28 is connected to a shiftable armature or core 30 and the contactor 29 is connected to a similar shiftable armature or core 31. Both these armatures are subject to the influence of the windings 32 included in a shunt circuit energized by the secondary 23 of the transformer, and also to the influence of the windings 33 which are included in a shunt circuit connected between the low voltage direct current conductors 19 and 20. The low voltage direct current conductors are energized only when the primary circuit is inert, and vice versa.

Consequently, if the primary circuit 15, 16 is energized the secondary 23 of the transformer will be excited and the coils 32 will draw the contactors 28, 29 into contact with the terminals 24, 25. On the other hand, if the low voltage direct current circuit 19, 20 is energized the coils 33 will draw the contactors 28, 29 into contact with the terminals 26 and 27. The contactors 28 and 29 are connected to control the leads 34 and 35 of the car lighting circuit. The lights are shown at 36 and are in parallel between the leads. The manually operated switch 37 controls the lights.

The parts so far described provide for lighting the train from the locomotive or from a city circuit or from an adjacent car. The locomotive furnishes current to the primary circuit 15, 16. A 110 volt A. C. city lighting circuit may furnish current to one car or to a whole train of connected cars by connection to one receptacle 18. If neither of these sources of current is available, the low voltage feeder circuit may be connected to an adjacent car having a 30 volt battery lighting system, or to any other source of suitable voltage, by means of the connectors 21. The energization of the low voltage feeder circuit shifts the contactors 28, 29 against the contacts 26 and 27 (the position shown in Fig. 3), and the car lights are then lighted by current supplied by the low voltage feeder circuit.

To provide for cases when none of the three sources of current just mentioned is available, I may equip each car with a small storage battery 38 and an auxiliary lighting circuit including the lead 35, switch 37, emergency lead 39 and lights 40. To prevent the simultaneous lighting of both sets of lights I introduce into the circuit a relay switch. This consists of a contactor 41 urged to a position in which it bridges the contacts 42 and drawn away from the contacts 42 upon the excitation of a winding 43. This winding 43 is connected between the leads 34 and 35. Thus when the main lighting circuit is energized either by direct or alternating current, the contactor 41 moves away from the contacts 42 and interrupts the emergency lighting circuit. When the main lighting circuit is de-energized, the relay contactor 41 will drop and close the emergency lighting circuit which will thereupon by lighted, if or when the switch 37 is closed.

In addition to the general availability of different sources of current the system has the advantage that the car lighting circuits operate at the standard car lighting voltage so that it is possible to convert existing equipment without undue expense. Converted equipment is available for use with existing equipment having batteries at least to a limited extent. The use of a relatively high voltage in the main train circuit permits the use of smaller train line conductors and avoids the serious voltage drop which occurs in low voltage train lines. Finally the system offers an opportunity for progressive conversion without serious inconvenience to a train lighting system in which the use of any but very small batteries is unnecessary. The desirability of such a system, and the large amounts already invested in battery systems, makes this an important factor in the practical availability of my system.

The invention may be embodied in various specifically different forms, and particularly it is possible to avail of any desired voltages. Those suggested have peculiar advantages under the conditions now existing on American railroads and for that reason are preferred.

What is claimed is:—

1. In a train lighting system, the combination with a railway train of a relatively high tension feeder line extending the length of the various cars and having connectors for establishing the feeder circuit through a series of cars; a relatively low tension feeder line extending the length of the various cars and having connectors for connecting said low tension circuit of any of said cars to a circuit on another car; a lighting circuit on each car operating at said low tension; transforming means for reducing the tension of energy from said high tension line to the tension at which said lighting circuit operates; and automatic switching means operable reversely upon the energization of the high tension feeder line and upon the energization of said low tension feeder line and serving to connect selectively either line, when energized, into feeding relation with said lighting circuit.

2. In a train lighting system, the combination with a railway train of a relatively high tension A. C. feeder line extending the length of the various cars and having connectors for establishing the feeder circuit through a series of cars; a relatively low tension feeder line extending the length of the various cars and having connectors for connecting said low tension circuit of any of said cars to a circuit on another car; a lighting circuit on each car operating at said low tension; a transformer having its primary connected with said high tension feeder line and its secondary arranged to deliver current at the tension under which said lighting circuit operates; and automatic switching means operable reversely upon the energization of said high tension feeder line and upon the energization of said low tension feeder line, and serving to connect selectively either feeder line, when energized, into feeding relation with said lighting circuit.

3. In a train lighting system, the combination with a locomotive and train of an A. C. generator on the locomotive arranged to deliver current at a voltage corresponding to that of alternating current sources along the railway; a feeder line extending from said generator throughout the train; connections whereby said line may be connected to other alternating current sources; a relatively low tension feeder line extending the length of the various cars and having connectors for connecting said low tension circuit of any of said cars to a circuit on another car; a lighting circuit on each car operating at said low tension; a transformer having its primary connected with said high tension feeder line and its secondary arranged to deliver current at the tension under which said lighting circuit operates; and automatic switching means operable reversely upon the energization of said high tension feeder line and upon the energization of said low tension feeder line, and serving to connect selectively either feeder line, when energized, into feeding relation with said lighting circuit.

4. In a train lighting system, the combination with a locomotive and train of an A. C. generator on the locomotive arranged to deliver current at a voltage corresponding to that of alternating current sources along the railway; a feeder line extending from said generator throughout the train; connections whereby said line may be connected to other alternating current sources; a relatively low tension feeder line extending the length of the various cars and having connectors for connecting said low tension circuit of any of said cars to a circuit on another car; a lighting circuit on each car operating at said low tension; a transformer having its primary connected with said high tension feeder line and its secondary arranged to deliver current at the tension under which said lighting circuit operates; automatic switching means operable reversely upon the energization of said high tension feeder line and upon the energization of said low tension feeder line, and serving to connect selectively either feeder line, when energized, into feeding relation with said lighting circuit; an emergency lighting circuit; a battery for feeding the same; a switch controlling both said lighting circuits; and an electrically actuated switch controlling said emergency circuit and operable by the energization of the first named lighting circuit to open the emergency lighting circuit.

5. The combination with a railway car of an electric lighting system including a high tension feeder line extending the length of the car and having connectors for establishing the feeder circuit through a series of connected cars; a relatively low tension feeder line extending the length of the car and having connectors for connecting said low tension circuit with another car or cars; a lighting circuit on said car operating at said low tension; transforming means for reducing the tension of energy from said high tension line; and automatic switching means operable reversely upon the energization of the high tension feeder line and upon the energization of said low tension feeder line, and serving to connect selectively either line, when energized, into feeding relation with said lighting circuit.

6. The combination with a railway car of an electric lighting system including a high tension feeder line extending the length of the car and having connectors for establishing the feeder circuit through a series of connected cars; connections whereby said line may be connected to current sources on the permanent way; a relatively low tension feeder line extending the length of the car and having connectors for connecting said low tension circuit with another car or cars; a lighting circuit on said car operating at said low tension; transforming means for reducing the tension of energy from said high tension line; and automatic switching means operable reversely upon the energization of the high tension feeder line and upon the energization of said low tension feeder line, and serving to connect selectively either line, when energized, into feeding relation with said lighting circuit.

In testimony whereof I have signed my name to this specification.

JESSE H. DAVIS.